Oct. 23, 1945.  J. G. FRANCIS  2,387,322
COFFEE BREWER
Filed March 19, 1942  2 Sheets-Sheet 1
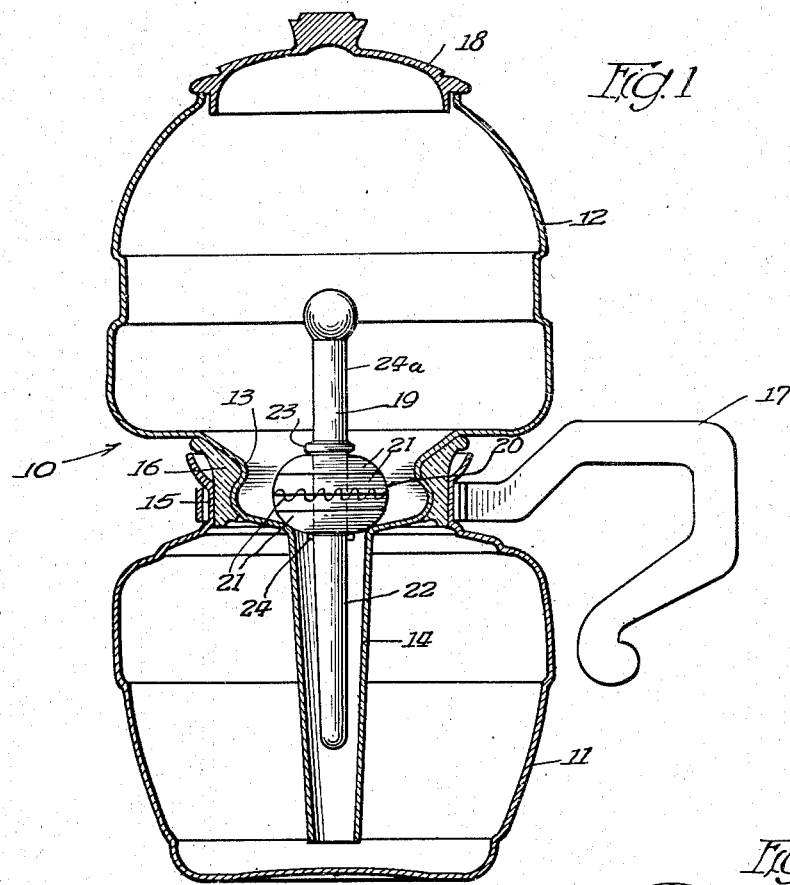
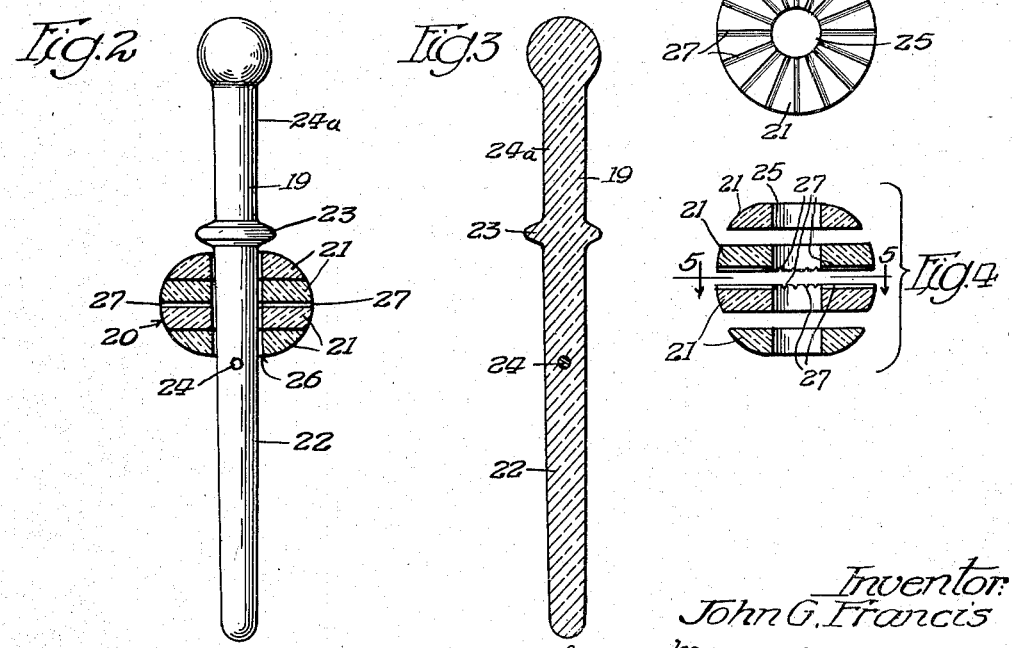
Inventor:
John G. Francis
By Spencer, Marzall, Johnston & Cook
Attys Oct. 23, 1945. J. G. FRANCIS 2,387,322
COFFEE BREWER
Filed March 19, 1942 2 Sheets-Sheet 2
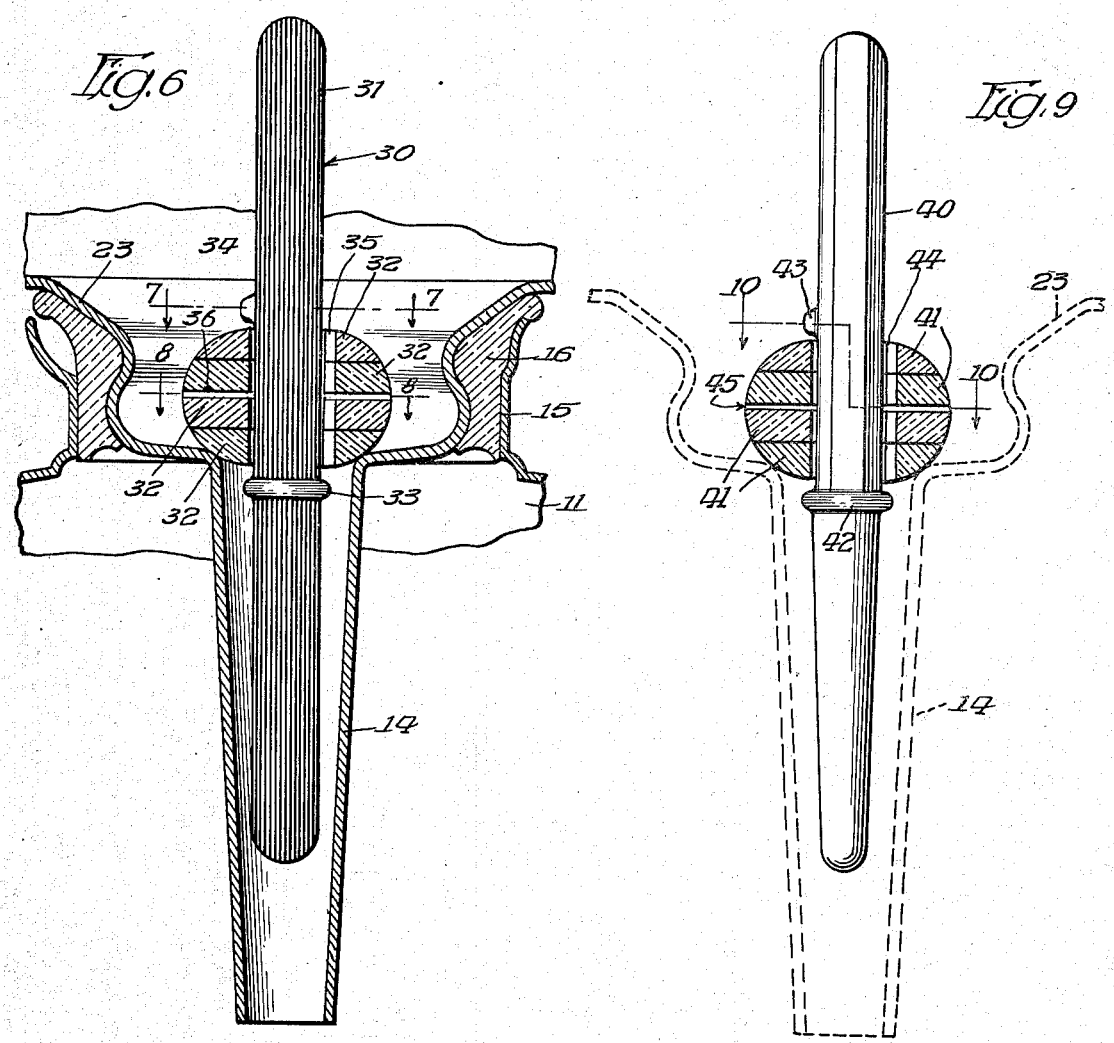
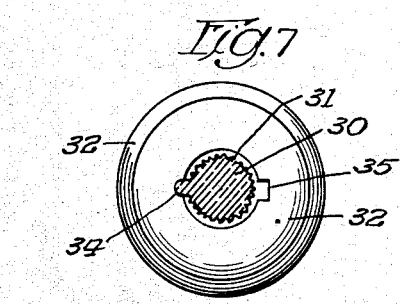
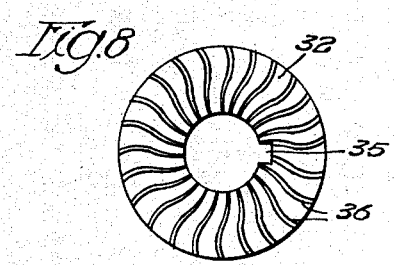
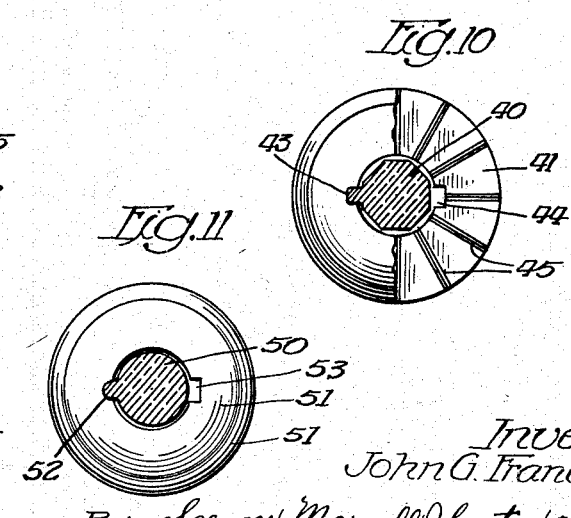
Inventor
John G. Francis
By Spencer, Marzall, Johnston & Cook
Attys Patented Oct. 23, 1945

2,387,322

UNITED STATES PATENT OFFICE 2,387,322

COFFEE BREWER

John G. Francis, Chicago, Ill., assignor to Chamberlain, Inc., Chicago, Ill., a corporation of Illinois Application March 19, 1942, Serial No. 435,330

7 Claims. (Cl. 99—292)

This invention relates to coffee brewers and more particularly to brewers of the vacuum percolating type.

In the brewing of coffee by the vacuum percolating method it is necessary to provide a suitable valve or strainer between the upper container which contains the ground coffee or the like and the lower container which contains the water and the brewed coffee. A primary object of the present invention is the provision of an improved valve for this purpose.

Various types of cloth and vitreous valve members or strainers have been proposed. The cloth strainer, however, is difficult to properly clean and use, and must be replaced from time to time. The vitreous type of valve member, as heretofore proposed, is subject to clogging by the coffee grounds with the result that the percolation or draining of the brewed coffee into the lower container is retarded, and there is constant danger of an injurious explosion since the clogging of the valve prevents the proper release of steam from the lower container.

It is, accordingly, a further object of the present invention to provide an improved valve for vacuum type percolators which normally does not require replacement during continued use of the device, which is easily washed and cleaned, which provides for readily and rapidly making clear coffee without grounds therein, and which always provides an outlet for escape of steam to prevent any danger of explosion.

A further object is the provision of a gravity seated type of valve which is not clogged by the coffee grounds or the percolation of the brewed coffee therethrough.

A further object is the provision of a valve having all of its parts made from a vitreous or like material and at all times providing a passage for the escape of steam without danger of clogging.

A further object is the provision of a vitreous gravity seated type of valve which may be readily removed from and replaced in the percolator, and which when removed may be simply separated into a plurality of parts to facilitate the proper washing and cleaning thereof.

A still further object is the provision of a vitreous gravity seated type of valve having a plurality of transversely arranged grooves or openings providing for the percolation of the coffee through the valve.

These and other objects and advantages will be apparent from the following description, the appended claims, and the accompanying drawings, which illustrate selected embodiments of the invention, and in which:

Fig. 1 is a central vertical section through a vacuum type percolator having a valve in accordance with the present invention associated therewith;

Fig. 2 is a view, partly in elevation and partly in section, of the valve shown in Fig. 1;

Fig. 3 is a sectional view of the valve stem shown in Figs. 1 and 2;

Fig. 4 is an exploded sectional view of certain of the valve parts;

Fig. 5 is a top view of one of the valve members taken on the line 5—5 of Fig. 4;

Fig. 6 is a fragmentary view illustrating a modified form of valve;

Fig. 7 is a sectional view taken on the line 7—7 of Fig. 6;

Fig. 8 is a view similar to Fig. 5 taken on the line 8—8 of Fig. 6;

Fig. 9 is a view illustrating a further modification in the valve construction;

Fig. 10 is a sectional view taken on the line 10—10 of Fig. 9; and

Fig. 11 is a view similar to Fig. 7 but showing a still further modification in the valve structure.

Referring to the drawings, and more particularly to Figs. 1 to 5 thereof, the reference numeral 10 designates a vacuum percolator comprising a lower container 11 and an upper container 12 having a generally cup-shaped portion 13 of reduced diameter at its lower end. The portion 13 terminates in a tube 14 which extends downwardly into the lower container and is open at its upper and lower ends. The lower container 11 is provided with a reduced neck portion 15 adapted to removably receive the portion 13 of the upper container. A gasket 16 of rubber or like material surrounds the portion 13 of the upper container and provides an air tight or hermetic seal between the upper and lower containers when the upper container is placed upon the lower.

The neck 15 of the lower container is preferably flared outwardly as shown in Fig. 1 to assist in filling the lower container with water and in pouring the contents therefrom. A handle 17 is operatively connected to the lower container, preferably at the neck 15, to facilitate in the use of the percolator. A top or closure 18 may also be provided for the upper open end of the container 12. The lower and upper containers 11 and 12 are preferably made from glass or other vitreous material, and the ground coffee or the like is placed in the cup-shaped portion 13 of the upper container.

A valve between the lower portion 13 of the upper container and the upper end of the tube 14 is provided to strain the coffee. The improved valve of the present invention is of the gravity seated, vitreous type and comprises a valve stem 19 and a valve part 20. The valve part 20 comprises a plurality of separate annular or ring shaped valve members 21. Each of the valve members 21 is preferably circular in transverse cross-section, as illustrated in Fig. 5, and has an outer curved periphery in vertical cross-section such that when in assembled position, as shown in Figs. 1 and 2, they provide a valve part having a smooth curved surface of generally oval shape in vertical cross-section.

The valve members 21 are adapted to be received upon a lower elongated end 22 of the valve stem 19, and are removably mounted thereon between a collar or shoulder 23 and a removable pin 24. The portion 22 of the valve stem is preferably of such length as to extend downwardly into the tube 14 and provide a guide for the valve during operation of the percolator. The valve stem also preferably extends upwardly above the collar or shoulder 23 to provide a handle portion 24a adapted to assist in removing the valve and replacing the same in the upper container 12.

The bore or central opening 25 of the valve members 21 is slightly larger than the diameter of the stem portion 22 so as to provide a longitudinally extending opening 26 between the valve stem and valve members. Each of the intermediate valve members 21 is also provided with a plurality of transverse V-shaped grooves 27 which communicate with the vertical passage 26 and with the exterior of the valve members. As is best shown in Fig. 4, the transverse grooves 27 are positioned on the adjoining faces of the intermediate valve members 21, and in the embodiment of the invention illustrated in Figs. 1 to 5, the grooves extend radially of the valve members, as indicated in Fig. 5.

The vertical distance between the collar or shoulder 23 and the removable pin 24 is such that there is a certain amount of vertical play between the stem 19 and the various valve members 21. Normally the valve members 21 rest against each other to provide a composite valve 20 which seats by gravity against the bottom of the cup-shaped portion 13 of the upper container and the upper end of the tube 14, and the lower beveled edge of the collar or shoulder 23 of the valve stem rests upon the uppermost valve member 21, thereby closing the upper end of the vertical passage-way 26. When heat is applied to the lower container and the water therein begins to rise into the upper container, the entire valve can become unseated to permit the free flow of water, and the valve members 21 may also open within the limit of the play between the collar 23 and pin 24 to permit the flow of water therethrough. After the upward flow of water has ceased, due to its level reaching the bottom of tube 14, the valve members 21 and the collar 23 again seat in their normal position as above described.

Upon reduction of the heat applied to the lower container the brewed coffee or the like returns to the lower container through the transverse grooves 27 and the vertical opening 26 which thus serves as duct means for conveying filtered coffee, delivered between the filter members, inwardly of the filtering grooves, downwardly through the filter member axially of the stem, to thus discharge the filtered coffee into the tube 14 downwardly of the stem therein. The size of the grooves 27 is such as to permit free flow of coffee or the like therethrough without clogging while preventing the entrance of any coffee grounds or like brewing substance into the lower container. Should an excessive amount of steam and expanded air develop in the lower container, it can readily escape through the multiple openings 27 without danger of exploding the lower vessel. The valve stem 20 may also rise within the limit of play permitted by the pin 24 and provides for additional escape of steam and expanded air through the top of the opening 26 in the valve. All of the valve parts are preferably made of glass or other vitreous material, and are readily disassembled by removing the pin 24 for cleaning and the like. The valve device may, of course, be used in the position shown in Fig. 4, or, if desired, it may be used in an inverted position with the stem portion 24a extending in the tube 14 and the stem portion 22 extending upwardly within the container 12.

Fig. 6 illustrates a modified form of the invention in which the valve stem 30 is provided with a plurality of vertically extending flutes or grooves 31 for assisting the flow of water and brewed liquid through the valve and for the escape of excessive steam and expanded air therethrough. In this form of the invention the valve members 32 are also connected to the valve stem 30 by means of a simple pin and slot connection. To this end the stem 30 is provided with a lower collar or shoulder 33 and an upper lug 34. The valve members 32 are provided with a vertically extending slot 35 adapted to be passed over the lug 34 and then rotated to lock the members 32 on the stem 30 between the collar 33 and lug 34. Also in this form of the invention the grooves 36 between the intermediate valve members 32 are of a generally spiral or curved formation as illustrated in Fig. 8.

Fig. 9 illustrates a further modification in which the upper portion 40 of the valve stem is of an octagonal or other polygonal shape to assist the flow of liquid and steam through the valve. This modification, like that of Fig. 6, illustrates the valve members 41 as being attached to the valve stem by means of a pin and slot connection comprising a collar 42 and a lug 43 on the valve stem and a slot 44 in the valve members. In this particular illustrated embodiment of the invention the grooves 45 are illustrated as being radial, as in the embodiment of Figs. 1 to 5.

Fig. 11 illustrates a modification in which a valve stem 50 of circular cross-section is connected with valve members 51 by means of a pin and slot connection comprising a lug 52 on the valve stem and a slot 53 on the valve members 51. The construction is otherwise similar to the above described embodiments, and may have transversely extending grooves between the valve members 51 of any desired shape.

The valve devices shown in Figs. 6–11 may, of course, be used in the position illustrated in Figs. 6 and 9, or, if desired, they may be used in inverted positions. It will be apparent, also, that the valve members, or discs, will normally be oriented or turned on the supporting stem to offset the notches 35, 44, or 53, as the case may be, of adjacent valve members, and thus prevent coffee grains from passing through the notches downwardly into the lower container.

A vacuum type percolator is thus provided having a valve, preferably of vitreous material, which is simple to install and remove, which is readily cleaned, and which does not require replacement during normal use. The invention also provides for draining the coffee or the like from the upper container into the lower at a relatively rapid rate and without clogging, and at the same time provides for making a clear brew. The invention further provides at all times for the ready escape of steam and expanded air, thereby avoiding any danger of exploding the percolator.

Changes may be made in the form, construction and arrangement of the parts without departing from the spirit of the invention; and the right is hereby reserved to make all such changes as fairly fall within the scope of the following claims.

The invention is hereby claimed as follows:

1. In a vacuum type percolator having upper and lower containers and a tube extending from the upper container into the lower, a gravity seated valve for said tube comprising a plurality of vitreous valve members adapted to seat one upon another and cooperating to provide a valve part for seating upon the lower end of the upper container, each of said members having a central opening providing a bore extending longitudinally through said valve part, at least one of said members having a plurality of transversely extending filtering grooves arranged on at least one face thereof, a valve stem of vitreous material extending through said bore, said bore having a cross-sectional area greater than that of said stem to provide a passage communicating with said filtering grooves, and means for removably mounting said valve members in operative position upon said valve stem, said means comprising spaced projections on the stem and adapted to receive said plurality of vitreous members therebetween.

2. In a vacuum type percolator having upper and lower containers and a tube extending from the upper container into the lower, a gravity seated valve for said tube comprising a plurality of vitreous valve members adapted to seat one upon another and cooperating to provide a valve part for seating upon the lower end of the upper container, each of said members having a central opening providing a bore extending longitudinally through said valve part, at least one of said members having a plurality of transversely extending filtering grooves arranged on at least one face thereof, a valve stem of vitreous material extending through said bore, said bore having a cross-sectional area greater than that of said stem to provide a passage communicating with said filtering grooves, and means for removably mounting said valve members in operative position upon said valve stem, said means including a projection on said stem and a pin and slot connection between the valve members and the valve stem.

3. A valve and strainer for use in vacuum type percolators comprising a vitreous stem member adapted to be loosely received within a percolator, a plurality of superposed vitreous valve strainer members adapted to seat one upon another and cooperating with said stem member to provide a valve for seating solely by gravity in said percolator, each of said valve members having a central opening therethrough for receiving said stem member longitudinally therethrough, at least one of said valve members having filtering grooves arranged on an inner face thereof, each said central opening being greater in cross-sectional area than the cross-sectional area of said stem to provide a passage communicating with said filtering grooves to relieve excess pressure in the percolator.

4. A valve and strainer for use in vacuum type percolators comprising a vitreous stem member adapted to be loosely received within a percolator, a plurality of superposed vitreous valve strainer members adapted to seat one upon another and cooperating with said stem member to provide a valve for seating solely by gravity in said percolator, each of said valve members having a central opening therethrough for receiving said stem member longitudinally therethrough, at least one of said valve members having transversely extending filtering grooves arranged on an inner face thereof, each said central opening being greater in cross-sectional area than the cross-sectional area of said stem to provide a passage communicating with said filtering grooves to relieve excess pressure in the percolator, and means for removably mounting said valve members in operative position upon said stem member, said means including a projection on said stem member and a pin and slot connection between the valve members and the stem member.

5. Valve and strainer means for use in a vacuum type percolator having upper and lower containers and a tube on and extending downwardly from the upper container into the lower container, said valve and strainer means comprising a central stem of vitreous material adapted to extend downwardly into the tube, a plurality of vitreous strainer members on and encircling said stem and adapted to seat one against the other to provide a valve adapted to seat in the percolator solely by gravity, at least one of said strainer members having filtering grooves formed in a face thereof in position to cooperate with the facing surface of an adjacent strainer member whereby liquid, in passing between the facing surfaces of said members, inwardly toward said stem, may be filtered and delivered, in filtered condition, between the members, inwardly of said grooves, at least one of said members being formed with duct means, inwardly of said grooves and communicating therewith, for the delivery of filtered liquid from between said strainer members in a direction axially of said stem, one of said strainer members comprising a held member secured against movement thereof along the stem in at least one direction, and at least another one of said strainer members being freely slidable on said stem away from said held strainer member to relieve excess pressure in the percolator, and retaining means on the stem to limit the movement of said freely slidable member on the stem in a direction away from said held strainer member.

6. Valve and strainer means for use in a vacuum type percolator having upper and lower containers and a tube on and extending downwardly from the upper container into the lower container, said valve and strainer means comprising a central stem of vitreous material adapted to extend downwardly into the tube, a plurality of vitreous strainer members on and encircling said stem and adapted to seat one against the other to provide a valve adapted to seat in the percolator solely by gravity, at least one of said strainer members having filtering grooves formed in a face thereof in position to cooperate with the facing surface of an adjacent strainer member whereby liquid, in passing between the facing surfaces of said members, inwardly toward said stem, may be filtered and delivered, in filtered condition, between the members inwardly of said grooves, at least one of said members being formed with duct means, inwardly of said grooves and communicating therewith, for the delivery of filtered liquid from between said strainer members in a direction axially of said stem and outwardly thereof, holding means on said stem, between the ends thereof, in position to engage one of said strainer members and prevent movement thereof along the stem in at least one direction, at least one of said strainer members being freely slidable on said stem away from said holding means, said freely slidable member being formed with a central opening for receiving the stem, and retaining means comprising a projection on said stem in position spaced from said holding means to limit the movement of said freely slidable member on the stem in a direction away from said holding means and the member held thereby, said central opening having a notch allowing the strainer member to pass said projection for removal from the stem when said notch and projection are in registration.

7. Valve and strainer means for use in a vacuum type percolator having upper and lower containers and a tube on and extending downwardly from the upper container into the lower container, said valve and strainer means comprising a central stem of vitreous material adapted to extend downwardly into the tube, a plurality of vitreous strainer members on and encircling said stem, said members having central openings for receiving the shaft therethrough and being adapted to seat one against the other to provide a valve adapted to seat in the percolator solely by gravity, said strainer members including a pair of end members and a pair of intermediate members of disc-like form disposed on the shaft between said end members, at least one of said intermediate strainer members having filtering grooves formed in a face thereof in position to cooperate with the facing surface of an adjacent strainer member whereby liquid, in passing between the facing surfaces of said members, inwardly toward said stem, may be filtered and delivered, in filtered condition, between the members inwardly of said grooves, holding means on said stem, between the ends thereof, in position engaging one of said end members to prevent movement thereof along the stem in at least one direction, the other end member and said intermediate members being freely slidable on said stem away from said holding means and the end member held thereby, to relieve excess pressure in the percolator, and retaining means spaced on the stem and said holding means to limit the movement of said freely slidable members on the stem in a direction away from said retaining means.

JOHN G. FRANCIS.